(12) United States Patent
Basetty et al.

(10) Patent No.: US 10,142,346 B2
(45) Date of Patent: Nov. 27, 2018

(54) EXTENSION OF A PRIVATE CLOUD END-POINT GROUP TO A PUBLIC CLOUD

(71) Applicant: Cisco Technology, Inc., San Jose, CA (US)

(72) Inventors: Pavan Basetty, San Jose, CA (US); Subrata Banerjee, San Jose, CA (US); Ruben Hakopian, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 182 days.

(21) Appl. No.: 15/222,851

(22) Filed: Jul. 28, 2016

(65) Prior Publication Data
US 2018/0034821 A1    Feb. 1, 2018

(51) Int. Cl.
| | |
|---|---|
| H04L 29/06 | (2006.01) |
| G06F 9/455 | (2018.01) |
| H04L 29/08 | (2006.01) |
| H04L 12/46 | (2006.01) |
| G06F 9/50 | (2006.01) |

(52) U.S. Cl.
CPC ........ H04L 63/101 (2013.01); G06F 9/45558 (2013.01); G06F 9/5072 (2013.01); H04L 12/4633 (2013.01); H04L 63/0272 (2013.01); H04L 63/20 (2013.01); H04L 67/10 (2013.01); H04L 67/12 (2013.01); *G06F 2009/4557* (2013.01); *G06F 2009/45587* (2013.01); *G06F 2009/45595* (2013.01)

(58) Field of Classification Search
CPC ... H04L 63/101; H04L 63/0272; H04L 67/12; H04L 63/20; H04L 67/10; H04L 12/4633; G06F 9/5072; G06F 2009/45587; G06F 2009/45595; G06F 2009/4557
See application file for complete search history.

(56) References Cited

U.S. PATENT DOCUMENTS

| | | |
|---|---|---|
| 6,108,782 A | 8/2000 | Fletcher et al. |
| 6,178,453 B1 | 1/2001 | Mattaway et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Extended European Search Report from the European Patent Office for the corresponding European Patent Application No. 17181901.4, dated Sep. 8, 2017, 10 pages.

(Continued)

*Primary Examiner* — Michael Pyzocha
(74) *Attorney, Agent, or Firm* — Polsinelli PC

(57) ABSTRACT

Disclosed are systems, methods and computer-readable storage medium for extending a private cloud to a public cloud. The private cloud can be extended to the public cloud by establishing a virtual private network between a private cloud and a public cloud, receiving one or more access control lists provisioned by the private cloud, determining contracts between an end point group of the private cloud and an end point group of the public cloud based on the one or more access control lists, and extending the end point group of the private cloud to the end point group of the public cloud across the virtual private network.

20 Claims, 7 Drawing Sheets

(56) References Cited

U.S. PATENT DOCUMENTS

| | | |
|---|---|---|
| 6,298,153 B1 | 10/2001 | Oishi |
| 6,343,290 B1 | 1/2002 | Cossins et al. |
| 6,721,804 B1 | 4/2004 | Rubin et al. |
| 6,733,449 B1 | 5/2004 | Krishnamurthy et al. |
| 7,028,098 B2 | 4/2006 | Mate et al. |
| 7,054,930 B1 | 5/2006 | Cheriton |
| 7,277,948 B2 | 10/2007 | Igarashi et al. |
| 7,480,672 B2 | 1/2009 | Hahn et al. |
| 7,496,043 B1 | 2/2009 | Leong et al. |
| 7,881,957 B1 | 2/2011 | Cohen et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,630,291 B2 | 1/2014 | Shaffer et al. |
| 8,639,787 B1 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,111,013 B2 | 8/2015 | Cheriton |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 * | 2/2016 | Ancin ............... G06F 15/17331 |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 9,825,902 B1 | 11/2017 | Sharma et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0228585 A1 | 12/2003 | Inoko et al. |
| 2004/0095237 A1 | 5/2004 | Chen et al. |
| 2005/0060418 A1 | 3/2005 | Sorokopud |
| 2006/0087962 A1 | 4/2006 | Golia et al. |
| 2006/0126665 A1 | 6/2006 | Ward et al. |
| 2007/0242830 A1 | 10/2007 | Conrado et al. |
| 2008/0165778 A1 | 7/2008 | Ertemalp |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0072489 A1 | 3/2011 | Parann-Nissany |
| 2011/0075667 A1 | 3/2011 | Li et al. |
| 2011/0126099 A1 | 5/2011 | Anderson et al. |
| 2011/0138055 A1 | 6/2011 | Daly et al. |
| 2011/0145390 A1 | 6/2011 | Kakadia et al. |
| 2011/0145413 A1 | 6/2011 | Dawson et al. |
| 2011/0173303 A1 | 7/2011 | Rider |
| 2011/0185063 A1 | 7/2011 | Head et al. |
| 2011/0213966 A1 | 9/2011 | Fu et al. |
| 2011/0219434 A1 | 9/2011 | Betz et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0117571 A1 | 5/2012 | Davis et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |

(56) References Cited

U.S. PATENT DOCUMENTS

| | | |
|---|---|---|
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0091557 A1 | 4/2013 | Gurrapu |
| 2013/0097601 A1 | 4/2013 | Podvratnik et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0283364 A1* | 10/2013 | Chang .................... H04L 49/70 726/12 |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006585 A1 | 1/2014 | Dunbar et al. |
| 2014/0016476 A1 | 1/2014 | Dietz et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0075357 A1 | 3/2014 | Flores et al. |
| 2014/0075501 A1 | 3/2014 | Srinivasan et al. |
| 2014/0108985 A1 | 4/2014 | Scott et al. |
| 2014/0122560 A1 | 5/2014 | Ramey et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0189095 A1 | 7/2014 | Lindberg et al. |
| 2014/0189125 A1 | 7/2014 | Amies et al. |
| 2014/0222953 A1 | 8/2014 | Karve et al. |
| 2014/0244851 A1 | 8/2014 | Lee |
| 2014/0280805 A1* | 9/2014 | Sawalha ................ G06F 9/5072 709/222 |
| 2014/0282536 A1 | 9/2014 | Dave et al. |
| 2014/0282889 A1 | 9/2014 | Ishaya et al. |
| 2014/0297569 A1 | 10/2014 | Clark et al. |
| 2014/0317261 A1 | 10/2014 | Shatzkamer et al. |
| 2014/0366155 A1 | 12/2014 | Chang et al. |
| 2014/0369204 A1 | 12/2014 | Anand et al. |
| 2014/0372582 A1 | 12/2014 | Ghanwani et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0081762 A1 | 3/2015 | Mason et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0120914 A1 | 4/2015 | Wada et al. |
| 2015/0149828 A1* | 5/2015 | Mukerji ................ G06F 11/0709 714/37 |
| 2015/0227405 A1 | 8/2015 | Jan et al. |
| 2015/0242204 A1 | 8/2015 | Hassine et al. |
| 2015/0249709 A1* | 9/2015 | Teng .................... H04L 67/1097 707/785 |
| 2015/0280980 A1* | 10/2015 | Bitar .................... H04L 41/5051 709/226 |
| 2015/0281067 A1 | 10/2015 | Wu |
| 2015/0281113 A1 | 10/2015 | Siciliano et al. |
| 2015/0319063 A1 | 11/2015 | Zourzouvillys et al. |
| 2015/0326524 A1 | 11/2015 | Tankala et al. |
| 2015/0373108 A1 | 12/2015 | Fleming et al. |
| 2016/0062786 A1 | 3/2016 | Meng et al. |
| 2016/0065417 A1* | 3/2016 | Sapuram ............ G06Q 30/0631 709/223 |
| 2016/0094398 A1 | 3/2016 | Choudhury et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0164914 A1* | 6/2016 | Madhav .................. H04L 63/20 726/1 |
| 2016/0188527 A1 | 6/2016 | Cherian et al. |
| 2016/0226755 A1 | 8/2016 | Hammam et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0378389 A1* | 12/2016 | Hrischuk .............. G06F 3/0631 711/154 |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0171158 A1* | 6/2017 | Hoy .................... H04L 63/0272 |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 102918499 | 2/2013 |
| CN | 104320342 | 1/2015 |
| CN | 105740084 | 7/2016 |
| EP | 2228719 | 9/2010 |
| EP | 2439637 | 4/2012 |
| EP | 2648098 | 10/2013 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Kunz, Thomas, et al., "OmniCloud—The Secure and Flexible Use of Cloud Storage Services," 2014, retrieved from the internet at https://www.omnicloud.sit.fraunhofer.de/download/omnicloud-whitepaper-en.pdf on Sep. 13, 2017, 30 pages.

(56) References Cited

OTHER PUBLICATIONS

Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CITRIX, "Citrix StoreFront 2.0" White Paper, Proof of Concept Implementation Guide, Citrix Systems, Inc., 2013, 48 pages.
CITRIX, "CloudBridge for Microsoft Azure Deployment Guide," 30 pages.
CITRIX, "Deployment Practices and Guidelines for NetScaler 10.5 on Amazon Web Services," White Paper, citrix.com, 2014, 14 pages.
CSS CORP, "Enterprise Cloud Gateway (ECG)—Policy driven framework environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
KENHUI, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
NIELSEN, "SimMetry Audience Measurement—Technology," http://nielsen-admosphere.eu/products-and-services/simmetry-audience-measurement-technology/, accessed Jul. 22, 2015, 6 pages.
NIELSEN, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, http://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
SHUNRA, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.

(56) References Cited

OTHER PUBLICATIONS

Wikipedia; "Pipeline (Unix)", Wikipedia, May 4, 2014, 4 pages, https://en.wikipedia.org/w/index.php?title=Pipeline2/028Unix%29&oldid=606980114.

* cited by examiner

EXTENSION OF A PRIVATE CLOUD END-POINT GROUP TO A PUBLIC CLOUD

TECHNICAL FIELD

The present technology pertains to extending a private cloud to a public cloud, and more specifically creating a hybrid cloud by extending an end point group of a private cloud to a public cloud for increasing capacity.

BACKGROUND

A "hybrid cloud" is a cloud infrastructure composed of two or more clouds that inter-operate or federate. A hybrid cloud can be an interaction between private and public clouds where a private cloud connects to a public cloud and utilizes public cloud resources in a secure and scalable way. The hybrid cloud model provides key advantages over other cloud models. For example, the hybrid cloud model allows enterprises to protect their existing investment; maintain control of their sensitive data and applications; and maintain control of their network, computing, and storage resources. Additionally, hybrid clouds allow enterprises to scale their environment on demand, (i.e., during periods of seasonal workload, etc.).

While many applications are suited for corporate datacenters, there are others whose dynamic compute requirements make them appropriate for cloud-based deployment. For such applications, the challenge is to take advantage of the computing elasticity and economics of cloud computing without sacrificing the security that the information assets (e.g., databases, directories, repositories) gain from being located on-premises within the business' datacenters. To be a viable hybrid cloud solution, data must be kept secure, applications need not be re-architected, and clouds should be readily mobile. This can be particular important for seasonal workloads.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Figure 1:
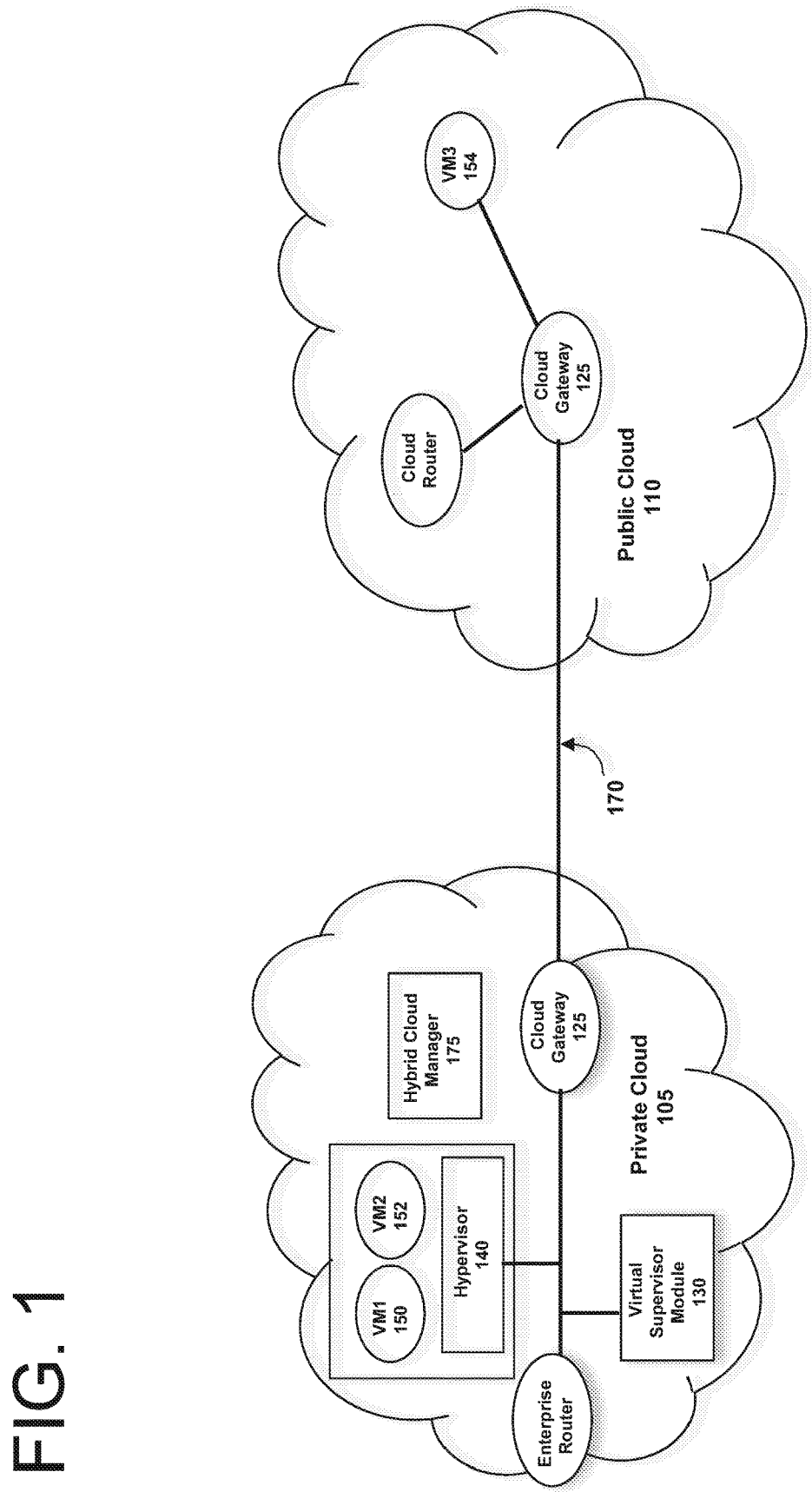
FIG. 1 illustrates an example hybrid cloud architecture.

Private clouds (e.g., enterprise datacenters, etc.) often have multiple end points in multiple groups or multiple tiers (web tier, application tier, database tier, etc.) securely, behind a firewall or other security devices. These multiple groups and tiers are managed locally or on-premise of the private cloud. Public clouds can run multiple groups or tiers as well, however, the public cloud is managed by the cloud provider network infrastructure. The different cloud management structures (between private clouds and public clouds) results in twice as much effort for an administrator (i.e., of a private cloud), along with contrasting security rules. Extending an end point group or tier of the private cloud to the public cloud (i.e., creating a hybrid cloud) can result in less effort by the administrator and streamline security rules between the private cloud and public cloud.

Disclosed are methods, systems and non-transitory computer-readable mediums for extending a private cloud to a public cloud. The extending of a private cloud to a public cloud can include establishing, by an orchestrator, a virtual private network between a private cloud and a public cloud, wherein the private cloud is behind a firewall. The orchestrator can receive one or more access control lists provisioned by the private cloud and determining contracts between an end point group of the private cloud and an end point group of the public cloud based on the one or more access control lists. The orchestrator can extend the end point group of the private cloud to the end point group of the public cloud across the virtual private network. The extending can further include enabling bi-directional communication between the end point group of the private cloud and the end point group of the public cloud.

The extending of a private cloud to a public cloud can include creating, by the orchestrator at the private cloud, a layer three connection bridge between the private cloud and the public cloud, wherein the layer three connection bridge is configured to enable communication from the end point group in the private cloud to the end point group in the public cloud. The layer three connection bridge can communicate with the end point group of the private network using a set of security and connectivity rules based on the contracts.

The extending of a private cloud to a public cloud can include the end point groups of the private cloud and the public cloud are in a web network tier and the orchestrator can be at the private cloud and/or at the public cloud.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for provisioning a router in a public cloud that can replicate some functionality of an enterprise router located on an enterprise network.

Cloud computing can be generally defined as Internet-based computing in which computing resources are dynamically provisioned and allocated to client or user computers or other devices on-demand from a collection of resources available via the network (e.g., "the cloud"). Cloud computing resources can include any type of resource such as computing, storage, network devices, virtual machines (VMs), etc. For example, cloud computing resources may include service devices (firewalls, deep packet inspectors, traffic monitors, etc.), processing devices (brute force processing capability), storage devices (e.g., servers, network attached storages, storage area network devices), etc., and may be used for instantation of VMs, databases, applications (Apps), etc.

As noted above, a "hybrid cloud" is a cloud infrastructure composed of two or more clouds that inter-operate or federate. A hybrid cloud can be an interaction between private and public clouds where a private cloud joins a public cloud and utilizes public cloud resources in a secure and scalable way. While many applications end point groups, and/or tiers could remain within corporate datacenters, there are other applications, end point groups, and/or tiers whose dynamic compute requirements make them good candidates for the cloud. For such applications, end point groups and/or tiers, the challenge is to take advantage of the computing elasticity and economics of cloud computing without sacrificing the security that the information assets (e.g., database, directories, repositories) gain from being located on-premises within the business' datacenters. To be a viable hybrid cloud solution, data must be kept secure, applications need not be re-architected, and clouds should be readily mobile.

FIG. 1 illustrates an example hybrid cloud network illustratively comprising a plurality of networks or "clouds," including a private cloud 105 (e.g., enterprise datacenters) and a public cloud 110 separated by a public network, such as the Internet (not shown). Although current terminology refers to a hybrid cloud comprising a private cloud and a public cloud, it should be understood that many aspects of this disclosure can be practiced in various multi-cloud configurations (e.g., two clouds hosted by third party providers or two enterprise clouds located in different locations). The private cloud 105 and public cloud 110 can be connected via a communication link 170 between cloud gateway 125 and cloud gateway 135. Data packets and traffic can be exchanged among the devices of the hybrid cloud network using predefined network communication protocols as will be understood by those skilled in the art.

As illustrated in FIG. 1, each cloud network element can have a cloud gateway 125 at the private cloud 105, a cloud gateway 135 at the public cloud 110, and at least one virtual machine (VM). For example, FIG. 1 illustrates multiple virtual machines (e.g. VM1 150, VM2 152), at the private cloud 105, and VM3 154 (or nested VM containers) within the public cloud. The cloud gateway 125 at the private cloud can be configured as a VM running in the private cloud (e.g., enterprise datacenter) that is responsible to establish a communication link 170 for interconnecting the components in the public cloud with the private cloud. The cloud gateway 135 at the public cloud may be configured as a VM running in the public cloud that is responsible to establish the communication link 170 for connecting the cloud gateway 135 with cloud resources.

FIG. 1 also illustrates an orchestrator 175 (e.g., hybrid cloud manager) within the private cloud 105 which can be a management plane VM for auto-provisioning resources within the hybrid cloud solution. Specifically, the orchestrator 175 is a management platform (which could be a VM) running in the private network, and may be generally responsible for providing the hybrid cloud operations, translating between private cloud and public cloud interfaces, management of cloud resources, dynamic instantiating of cloud gateways and cloud VMs components (VM3 154 in the public cloud 110) though the private virtualization platform and public cloud provider Application Program Interface ("API"). It may also health-monitor all the components (e.g., the cloud gateways, the one or more private application VMs, and the communication link 170 and provides high availability of those components.

FIG. 1 also illustrates a virtual supervisor module 130 (for example, the Nexus 1000V Switch by Cisco Systems, Inc.), a hypervisor 140 (also called a virtual machine manager) and one or more VM 150, 152. The virtual supervisor module 130 in the private cloud can be used to create VMs in the public or private cloud, such as VM1 150, VM2 152, and VM3 154. Each VM hosts a private application, even VM3 154 in the public cloud hosts a private application, and it is as though VM3 154 in the public cloud were within the private cloud. The hypervisor 140 can be configured by the virtual supervisor module 130, and provides an operating system for one or more VMs.

As introduced above, FIG. 1 also illustrates communication link 170. Communication link can take several forms include a type of VPN, or a tunnel. Specifically, some hybrid cloud technologies utilize an open virtual private network (VPN) overlay or else an IP security (IPSec) VPN based L3 network extension to provide communication link 170. Communication between the private cloud and public cloud over communication link 170, can be controlled by access control lists, updated at the private cloud.

Figure 2:
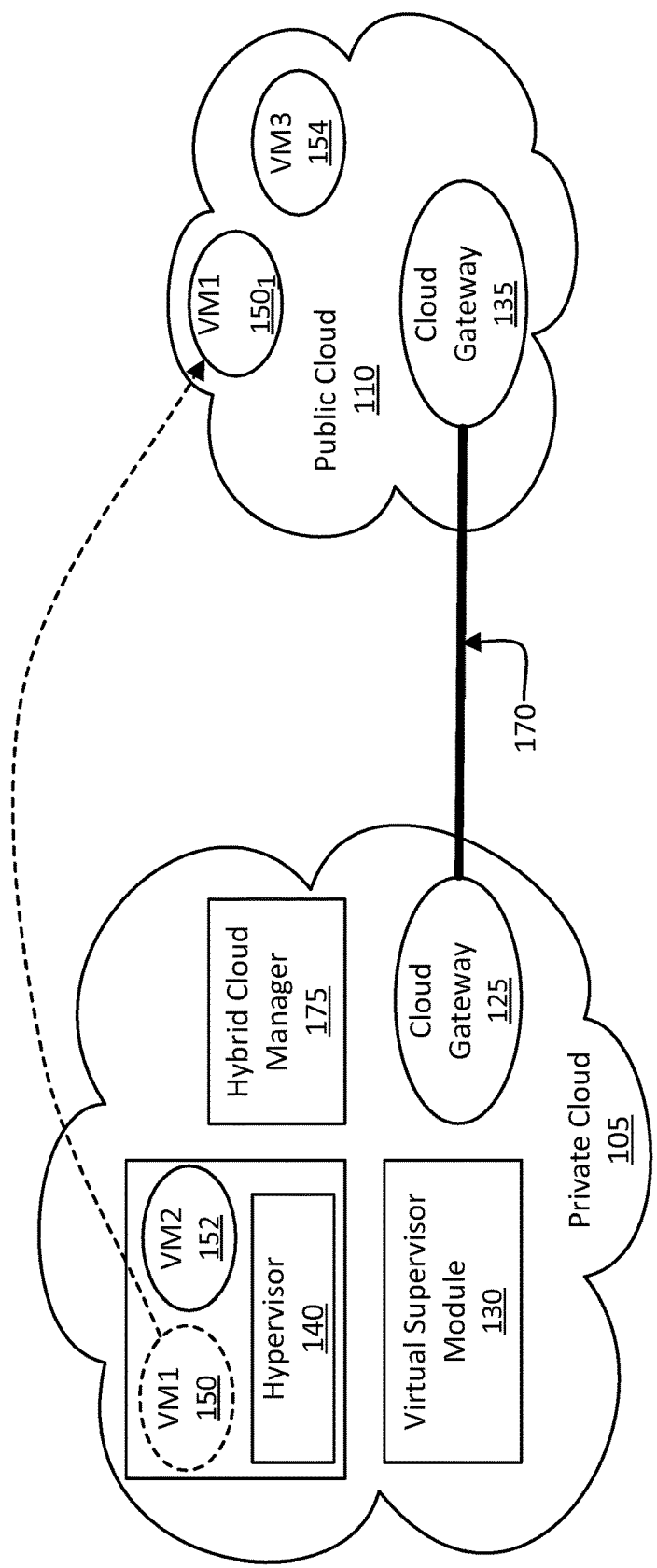
FIG. 2 illustrates an example of migrating a virtual machine in a hybrid cloud architecture.

FIG. 2 illustrates a hybrid cloud environment as illustrated in FIG. 1 being used to migrate a VM from private cloud 105 to public cloud 110. Perhaps a VM on the private cloud needs to be scaled beyond the current resources of the private cloud, or perhaps the private cloud needs to be taken off line for a period of time. In either situation it can be desirable to migrate an application on the private cloud to the public cloud. FIG. 2 illustrates VM1 150 on private cloud 105 being migrated to public cloud 110, where it is illustrated as VM1 $150_1$. Migration is managed using virtual supervisor module 130 to take VM1 150 offline, and migrated using orchestrator 175 to copy the VM1 150 disk image to public cloud 110, and instantiate it in the public cloud. Orchestrator 175, can provision contracts (e.g., access control lists) between the private cloud 105 and public cloud 110 to enable VM1 150 on the private cloud to be migrated to the public cloud.

Figure 3:
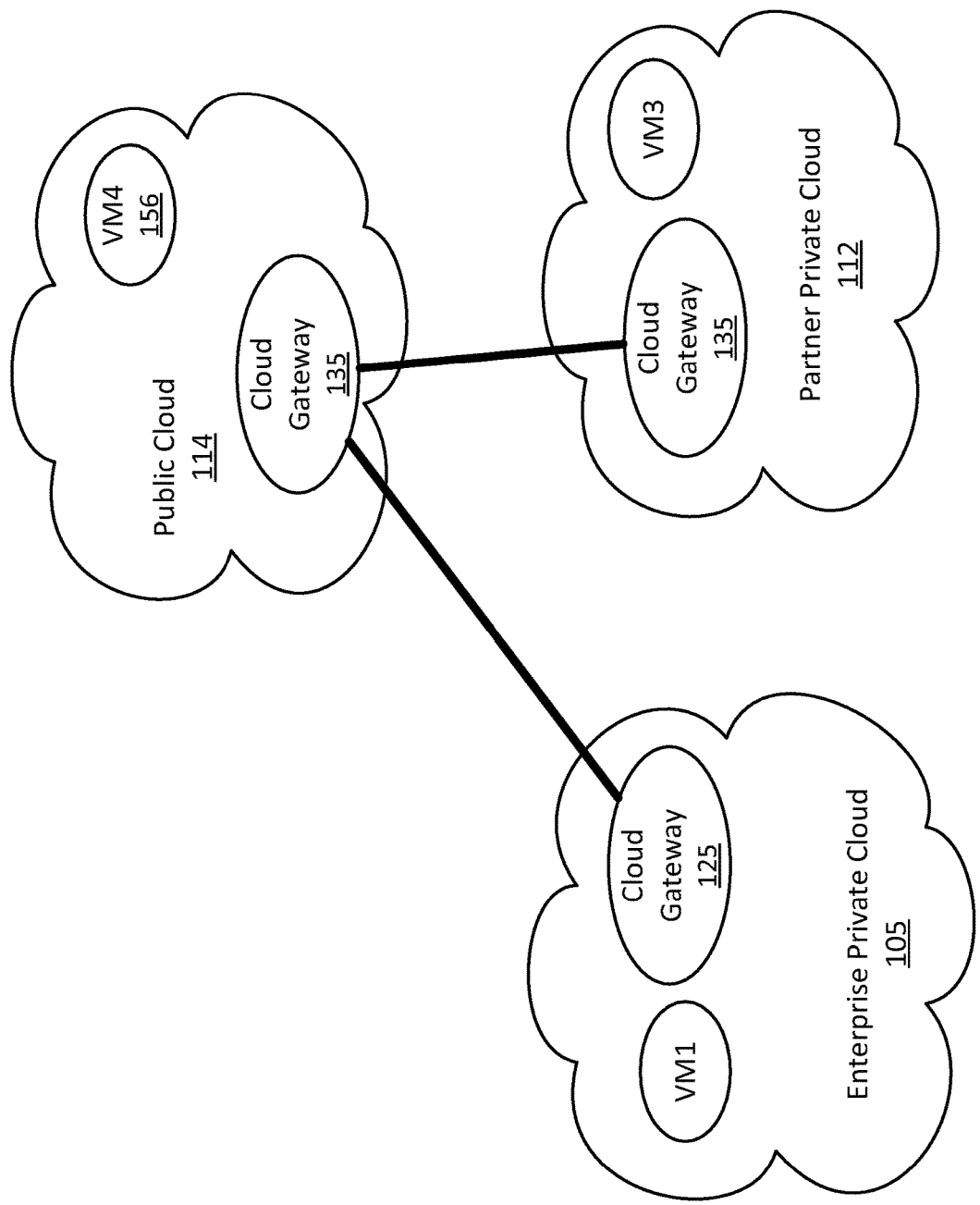
FIG. 3 illustrates an example hybrid cloud wherein one private cloud is in communication with multiple public clouds.

FIG. 3 illustrates an example hybrid cloud environment. In FIG. 3, a public cloud 114 is running an application or service in VM4 156. The application is shared by the enterprise private cloud 105 and partner private cloud 112. In such hybrid cloud environments a public cloud can act as an intermediary that provides limited access to the enterprise and the partner.

Figure 4:
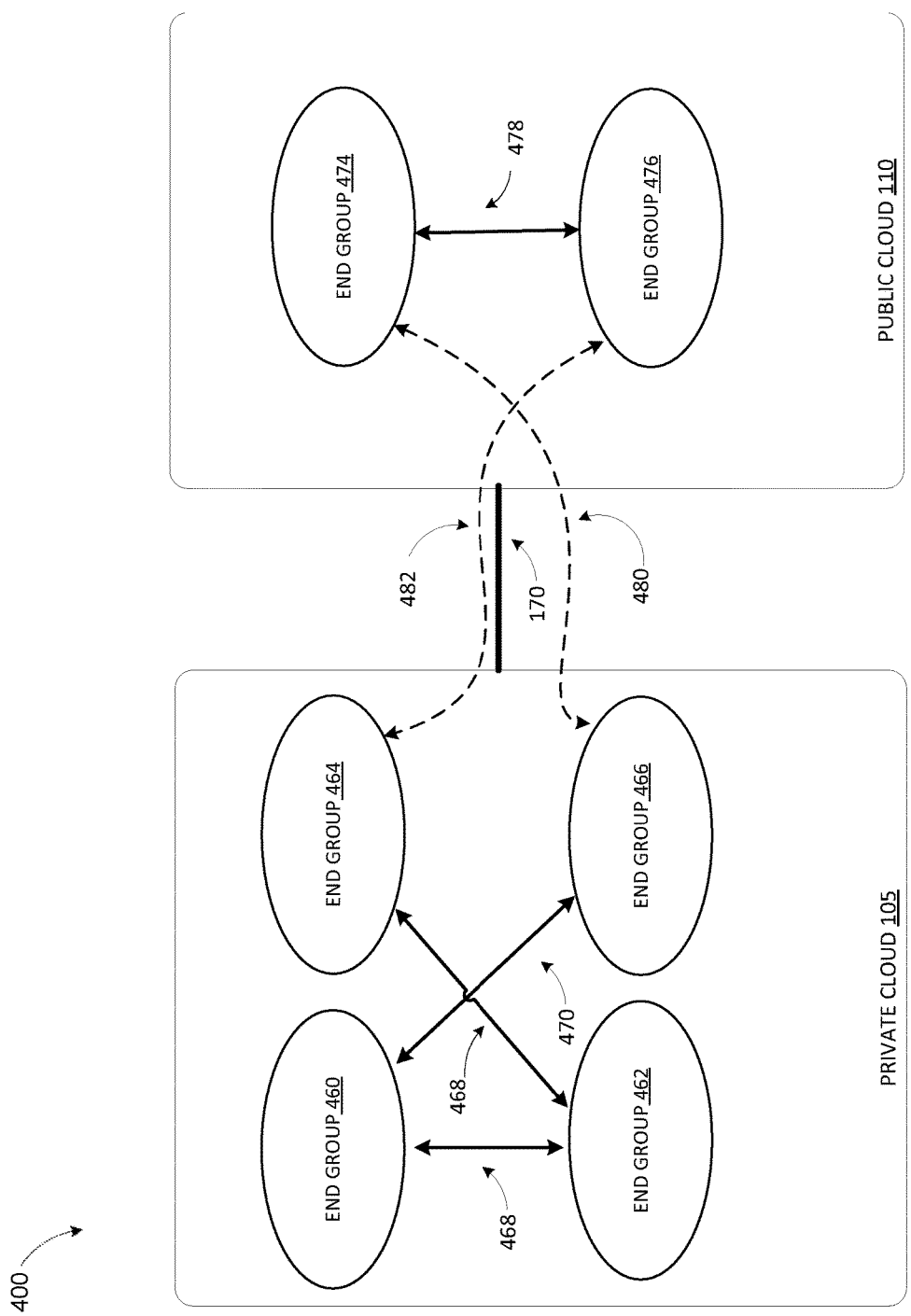
FIG. 4 illustrates an example of extending an end point group of a private cloud to a public cloud.

As shown in FIG. 1, private cloud 105 can be extended to public cloud 110 over communication link 170 (e.g., VPN, layer three bridge connection, etc.). Referring now to FIG. 4, which illustrates a creation of hybrid cloud 400 by extending an end point group (e.g., one or more end points) of private cloud 105 to public cloud 110 based, on contracts (e.g., based on one or more access control lists) provisioned at private cloud 105 (e.g., orchestrator 175, etc.). An end point is a network connection point identified by a media access control (MAC) address. An end point can be physical (e.g., network interface card in a server, router, switch, etc.). An end point can also be virtual (e.g., virtual network interface card in a virtual machine, etc.). An end point can join one or more end point groups based on specific criteria (e.g., IP subnet, switch interface, VLAN, tier, etc.). In some examples, the criteria can be predetermined. In some examples, the criteria can be dynamically determined. An end point group can include one or more physical or virtual end points from different hosts (e.g., servers, routers, switches, virtual machines, etc.) that belong to the same domain (e.g., private cloud 105, enterprise datacenter, etc.). Each domain can be managed by a single entity (e.g., administrator of private cloud).

For example, private cloud 105 can include one or more local end point groups (e.g., 460, 462). These local end point groups are created by an administrator and can include one or more end points in the private cloud, as described above. Local end point group 460 can communicate with local end point group 462 using contract 468. Contract 468 is created by the administrator and can be based (or include) one or more access control lists. The access control lists can include one or more of access control entries that identify a trustee and specify the access rights allowed, denied, or audited for that trustee.

In some examples, private cloud 105 can include one or more private orchestrator end point groups (e.g., 464, 466). The private orchestrator end point groups are created by the orchestrator 175 based on one or more contracts (e.g., one or more access control lists). For example, orchestrator 175 can determine contract 472 exists between private orchestrator end point group 464 and local end point group 462. In response to determining contract 472 exists, orchestrator 175 can configure security and connectivity rules to enable communication between end points 462, 464. Orchestrator 175 can also determine contract 470 exists between private orchestrator end point group 466 and local end point group 460. In response to determining contract 470 exists, orchestrator 175 can configure security and connectivity rules to enable communication between end points 460, 466.

In some examples, public cloud 110 can include one or more public orchestrator end point groups (e.g., 474, 476). The public orchestrator end point groups are created by the orchestrator. Orchestrator 175 can create contracts (for communication between end point groups and/or tiers) between private cloud 105 and public cloud 110. The contracts can be created based on access control lists provisioned by private cloud 105. For example, contract 478 can enable communication between public orchestrator end point group 474 and 476. Contracts can also enable communication between two or more end points in private cloud 105 and public cloud 110. For example, contract 480 can extend (e.g., enable communication) between private orchestrator end point group 466 and public orchestrator end point group 474; and contract 482 can extend (e.g., enable communication) between private orchestrator end point group 464 and public orchestrator end point group 476. In each of these preceding examples, orchestrator 175 extends the private end point group into the public cloud by configuring security and connectivity rules for data communication between the end points specified in the contract over communication link 170 (e.g., VPN). The security and connectivity rules are configured on both private cloud 105 and public cloud 110. Orchestrator 175 can perform the extension and configuration of security and connectivity rules automatically after determining (or creating) a contract (based on access control lists) specification the connection of two or more end points exists. As illustrated in hybrid cloud 500 of FIG. 5, multiple tiers (e.g., web tier 580, application tier 582, database tier 584) of private cloud 105 can be extended into public cloud 110. Public cloud 110 and private cloud 105 can join together to form a "hybrid cloud." End point groups in the hybrid cloud can be managed and connected based on contracts configured by an administrator of public cloud 110 or an orchestrator 175. In some examples, end point groups can be tiers (e.g., web tier 580, application tier 582, database tier 582). Accordingly, an entire tier (e.g., end point group) can be extended from private cloud 105 to public cloud 110 by communication link 170 (e.g., VPN). In some examples, each tier can be include a firewall. The firewall can regulate the incoming and outgoing traffic of the associated tier (or end point group).

Figure 5:
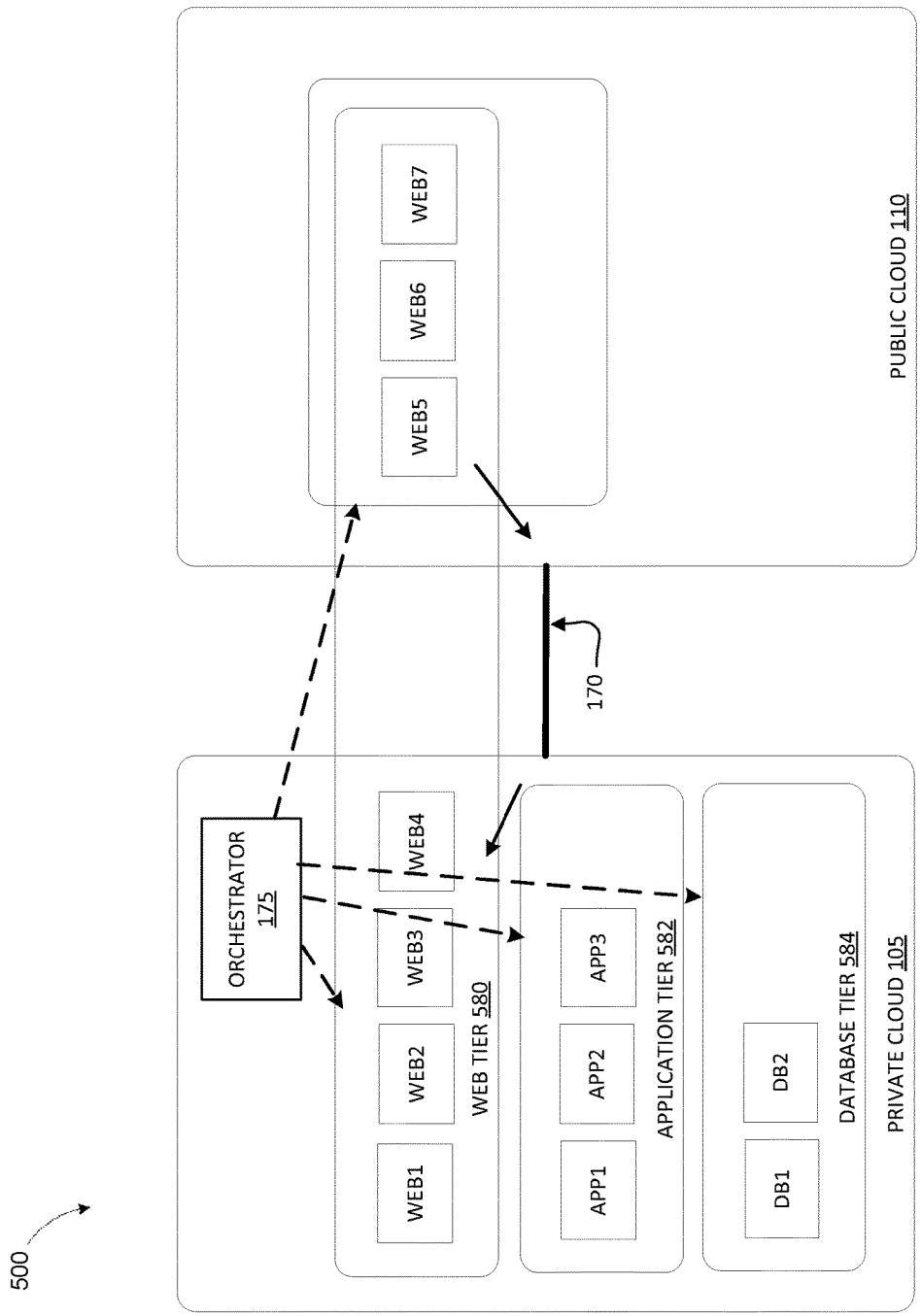
FIG. 5 illustrates an example of extending tier of a private cloud to a public cloud.

FIG. 5 further illustrates the extension of web tier 580 from private cloud 105 to public cloud 110. Orchestrator 175 can (e.g., automatically) determine (or create) one or more contracts (e.g., based access control lists) of private cloud 105. The one or more contracts can include allowable communication between web tier 580 (e.g., private orchestrator end point group) of private cloud 105 and web tier 581 (e.g., public orchestrator end point group) of public cloud 110. In response to determining (or creating) the one or more contracts, orchestrator 175 can, (e.g., automatically) configure security and connectivity rules (e.g., contracts, access control lists, etc.) at the private cloud 105 and similarly configure security and connectivity rules at public cloud 110. Once orchestrator 175 has configured both the security and connectivity rules on private cloud 105 and public cloud 110, web tier 580 is extended from private cloud 105 to public cloud 110. The extension across communication link 170, enables public end points (e.g., web5, web6, web7, etc.) of web tier 581 to operate as though they are private end points (e.g., web1, web2, web3, web4, etc.) of web tier 580. Once the security and connectivity rules are automatically provisioned by orchestrator 175 and web tier 580 is extended to the public cloud 110, a user (i.e., of web tier 580) will experience access to web tier 580 as if is was all end points were located within private cloud 105 (i.e., transparent to the extension into public cloud 110).

In some examples, orchestrator 175 can also provide monitoring and troubleshooting of the extended web tier 581 and associated public end points (e.g., web5, web6, web7, etc.) of public cloud 110. The monitoring and troubleshooting of extended web tier 581 is substantially equivalent to the monitoring and troubleshooting of the web tier 580 of private cloud 105. Monitoring and troubleshooting can include, but is not limited to, statistics, faults, events, audit logs, permit flow logs, deny flow logs, etc. Orchestrator 175 can provide, an administrator, a consolidated view of these aspects across the private cloud 105 and public cloud 110 (e.g., by aggregating the data across the private and public clouds and presenting the data to the administrator as if all end points are within the private cloud.) In some examples, data requested by a user, residing on an end point (e.g., web5, web6, web7, etc.) can be retrieved on demand upon request or query by the user. In some examples, data can be periodically fetched by the private cloud and stored locally.

Figure 6:
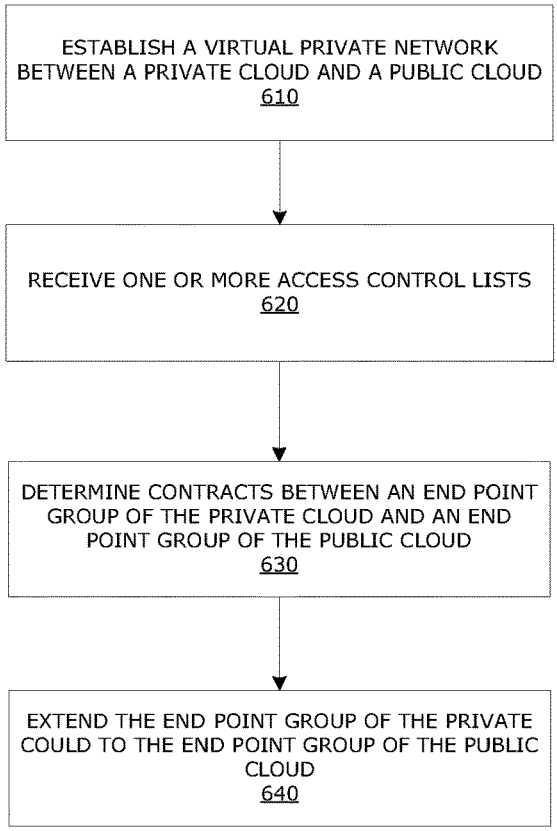
FIG. 6 illustrates an example method of extending a private cloud to a public cloud.

The method shown in FIG. 6 is provided by way of example, as there are a variety of ways to carry out the method. Additionally, while the example method is illustrated with a particular order of sequences, those of ordinary skill in the art will appreciate that FIG. 6 and the sequences shown therein can be executed in any order that accomplishes the technical advantages of the present disclosure and can include fewer or more sequences than illustrated.

Each sequence shown in FIG. 6 represents one or more processes, methods or subroutines, carried out in the example method. The sequences shown in FIG. 6 can be implemented in a system such as hybrid clouds 100, 400, and 500 shown in FIGS. 1, 4, and 5. The flow chart illustrated in FIG. 6 will be described in relation to and make reference to at least the elements of hybrid clouds 100, 400, and 500 shown in FIGS. 1, 4, and 5.

Method 600 can begin at step 610. At step 610, a virtual private network can be established between a private cloud and a public cloud. For example, orchestrator 175 can establish, from private cloud 105, a virtual private network for bi-directional communication with public cloud 110.

At step 620, the orchestrator can receive one or more access control lists. For example, orchestrator 175 can receive an access control list provisioned by private cloud 105. In some examples, the access control list can be provisioned by an administrator. In some examples, the access control lists can be stored and transmitted to the orchestrator by an end point.

At step 630, the orchestrator can determine contracts between one or more end point groups. For example, orchestrator 175 can determine (or create) contracts (e.g., for communication between end point groups) based on the received access control lists. In some examples, the contracts can be for communication between one or more end points groups (e.g., 460, 462, 464, 466) within private cloud 105. In some examples, the contracts can be for communication between one or more end points groups (e.g., 460, 462, 464, 466) in private cloud 105 and one or more end points groups (e.g., 474, 476) in public cloud 110. In some examples, an end point group can be a tier level (e.g., web tier 580, application tier 582, database tier 584, etc.)

At step 640, the orchestrator can extend the end point group of the private cloud to the end point group of the public cloud. For examples, end point group 466 can be extended to end point group 474 through communication link 170 based on the contracts. The extension enables a user of an end point (of end point group 466) to access end points in group 474 transparently (i.e., without knowing the end point is in public cloud 110).

Figure 7A:
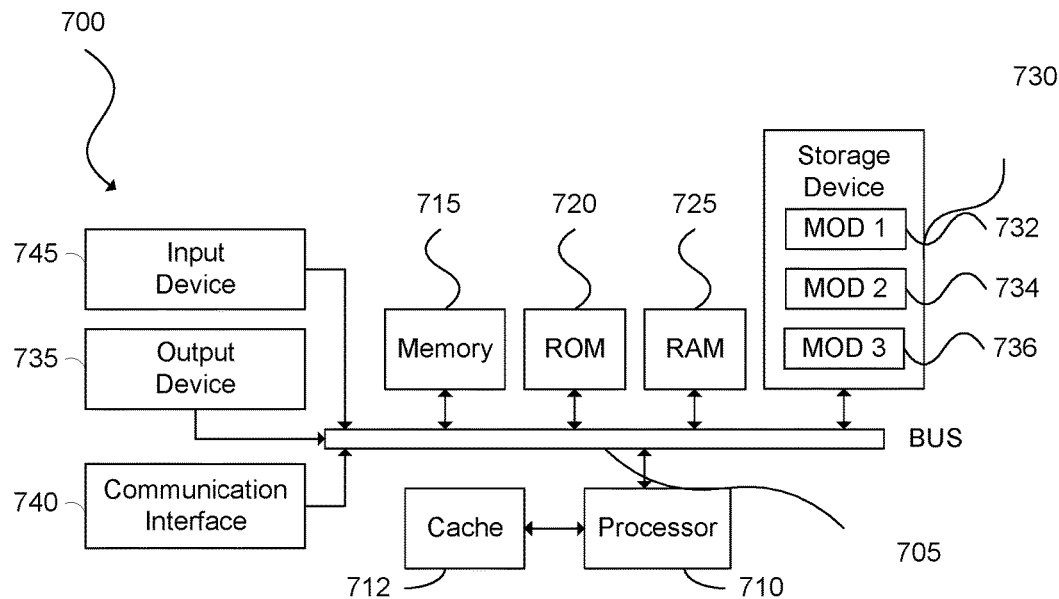
FIG. 7A shows an exemplary possible system embodiment for implementing various embodiments of the present technology.
Figure 7B:
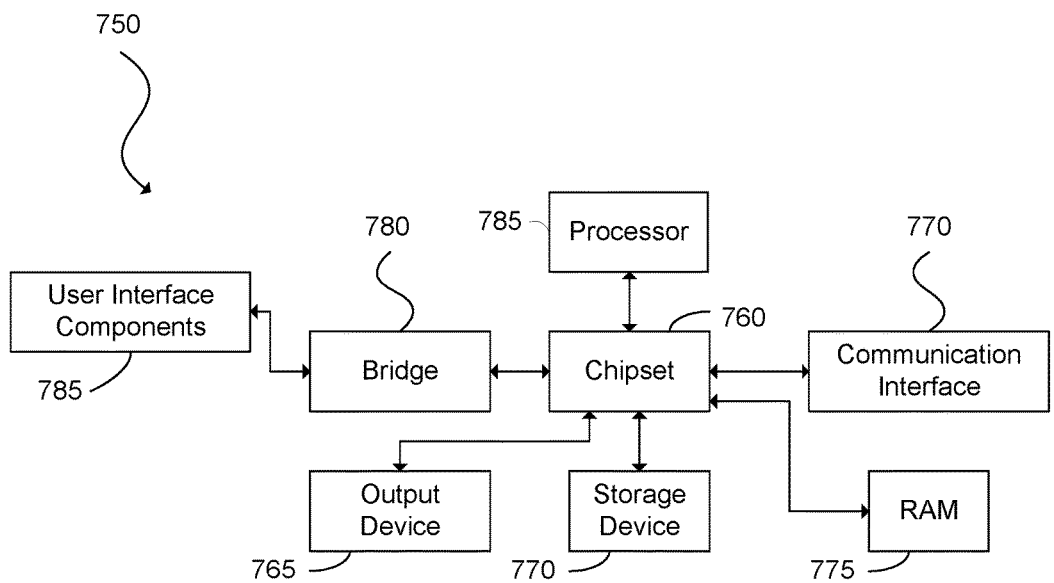
FIG. 7B shows an exemplary possible system embodiment for implementing various embodiments of the present technology.

FIG. 7A and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 70. Exemplary computing system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method of extending a private cloud to a public cloud, the method comprising:
    establishing, by an orchestrator, a virtual private network between a private cloud and a public cloud, wherein the private cloud is behind a firewall;
    receiving, by the orchestrator, one or more access control lists provisioned by the private cloud;
    determining, by the orchestrator, contracts between an end point group of the private cloud and an end point group of the public cloud based on the one or more access control lists;
    extending, by the orchestrator, the end point group of the private cloud to the end point group of the public cloud across the virtual private network; and
    monitoring and troubleshooting, by the orchestrator, the end point group of the public clouds and associated public endpoints of the public cloud.

2. The method of claim 1, wherein the extending further comprising:
    enabling bi-directional communication between the end point group of the private cloud and the end point group of the public cloud.

3. The method of claim 1, further comprising:
    creating, by the orchestrator at the private cloud, a layer three connection bridge between the private cloud and the public cloud, wherein the layer three connection bridge is configured to enable communication from the end point group in the private cloud to the end point group in the public cloud.

4. The method of claim 3, wherein the layer three connection bridge communicates with the end point group of the private network using a set of security and connectivity rules based on the contracts.

5. The method of claim 1, wherein the end point groups of the private cloud and the public cloud are in a web network tier.

6. The method of claim 1, wherein the orchestrator is at the private cloud.

7. The method of claim 1, wherein the orchestrator is at the public cloud.

8. An orchestrator of a private cloud comprising:
    a processor device; and
    a computer-readable storage medium device having stored therein instructions which, when executed by the processor device, cause the processor device to:
        establish a virtual private network between a private cloud and a public cloud, wherein the private cloud is behind a firewall;
        receive one or more access control lists provisioned by the private cloud;
        determine contracts between an end point group of the private cloud and an end point group of the public cloud based on the one or more access control lists;
        extend the end point group of the private cloud to the end point group of the public cloud across the virtual private network; and
        monitoring and troubleshooting the end point group of the public cloud and associated public endpoints of the public cloud.

9. The orchestrator of claim 8, comprising further instructions which, when executed by the processor device, cause the processor to:
   enable bi-directional communication between the end point group of the private cloud and the end point group of the public cloud.

10. The orchestrator of claim 8, comprising further instructions which, when executed by the processor device, cause the processor device to:
   create, at the private cloud, a layer three connection bridge between the private cloud and the public cloud, wherein the layer three connection bridge is configured to enable communication from the end point group in the private cloud to the end point group in the public cloud.

11. The orchestrator of claim 10, wherein the layer three connection bridge communicates with the end point group of the virtual private network using a set of security and connectivity rules based on the contracts.

12. The orchestrator of claim 8, wherein the end point groups of the private cloud and the public cloud are in a web network tier.

13. The orchestrator of claim 8, wherein the orchestrator is at the private cloud.

14. The orchestrator of claim 8, wherein the orchestrator is at the public cloud.

15. A non-transitory computer-readable storage medium having stored therein instructions which, when executed by a processor of an orchestrator, cause the processor to perform operations comprising:
   establish a virtual private network between a private cloud and a public cloud, wherein the private cloud is behind a firewall;
   receive one or more access control lists provisioned by the private cloud;
   determine contracts between an end point group of the private cloud and an end point group of the public cloud based on the one or more access control lists;
   extend the end point group of the private cloud to the end point group of the public cloud across the virtual private network; and
   monitor and troubleshoot, by the orchestrator, the end point group of the public cloud and associated public endpoints of the public cloud.

16. The non-transitory computer-readable storage medium of claim 15, the operations further comprising:
   enable bi-directional communication between the end point group of the private cloud and the end point group of the public cloud.

17. The non-transitory computer-readable storage medium of claim 15, the operation further comprising:
   create, at the private cloud, a layer three connection bridge between the private cloud and the public cloud, wherein the layer three connection bridge is configured to enable communication from the end point group in the private cloud to the end point group in the public cloud.

18. The non-transitory computer-readable storage medium of claim 17, wherein the layer three connection bridge communicates with the end point group of the virtual private network using a set of security and connectivity rules based on the contracts.

19. The non-transitory computer-readable storage medium of claim 15, wherein the end point groups of the private cloud and the public cloud are in a web network tier.

20. The non-transitory computer-readable storage medium of claim 15, wherein the orchestrator is at the private cloud.

* * * * *